United States Patent [19]

Aoki

[11] Patent Number: 4,500,101

[45] Date of Patent: Feb. 19, 1985

[54] REAR FENDER STRUCTURE FOR MOTORCYCLES

[75] Inventor: Masanori Aoki, Tokyo, Japan

[73] Assignee: Honda Giken Kogyo Kabushiki Kaisha, Tokyo, Japan

[21] Appl. No.: 563,889

[22] Filed: Dec. 22, 1983

Related U.S. Application Data

[63] Continuation of Ser. No. 304,468, Sep. 22, 1981, abandoned.

[30] Foreign Application Priority Data

Sep. 22, 1980 [JP] Japan .................................. 55-131914
Sep. 22, 1980 [JP] Japan .................................. 55-131915

[51] Int. Cl.$^3$ ............................................. B62J 15/00
[52] U.S. Cl. ................................. 280/152.1; 180/219
[58] Field of Search ............. 280/152.1, 152.3, 153 R; 180/219; D12/186; 403/119

[56] References Cited

U.S. PATENT DOCUMENTS 2,313,840  8/1983  Pleasant .............................. 403/119
4,347,909  9/1982  Takemura .......................... 180/219

FOREIGN PATENT DOCUMENTS 828244  5/1938  France ............................. 280/152.1

Primary Examiner—Joseph F. Peters, Jr.
Assistant Examiner—Joseph G. McCarthy
Attorney, Agent, or Firm—Sughrue, Mion, Zinn, Macpeak and Seas

[57] ABSTRACT

A motorcycle rear fender structure having a swingable rear fender. The rear fender is pivotally mounted on a motorcycle frame body. Further, the rear fender structure includes a side box which is fixed to the rear fender and is rotatable together with the swingable rear fender. The side box is also fixedly secured to the motorcycle frame body when the rear fender is held at its normal horizontal position. A utility rear receiving space may be made at the rear fender. Cowl portions are formed integrally with the rear fender.

21 Claims, 22 Drawing Figures

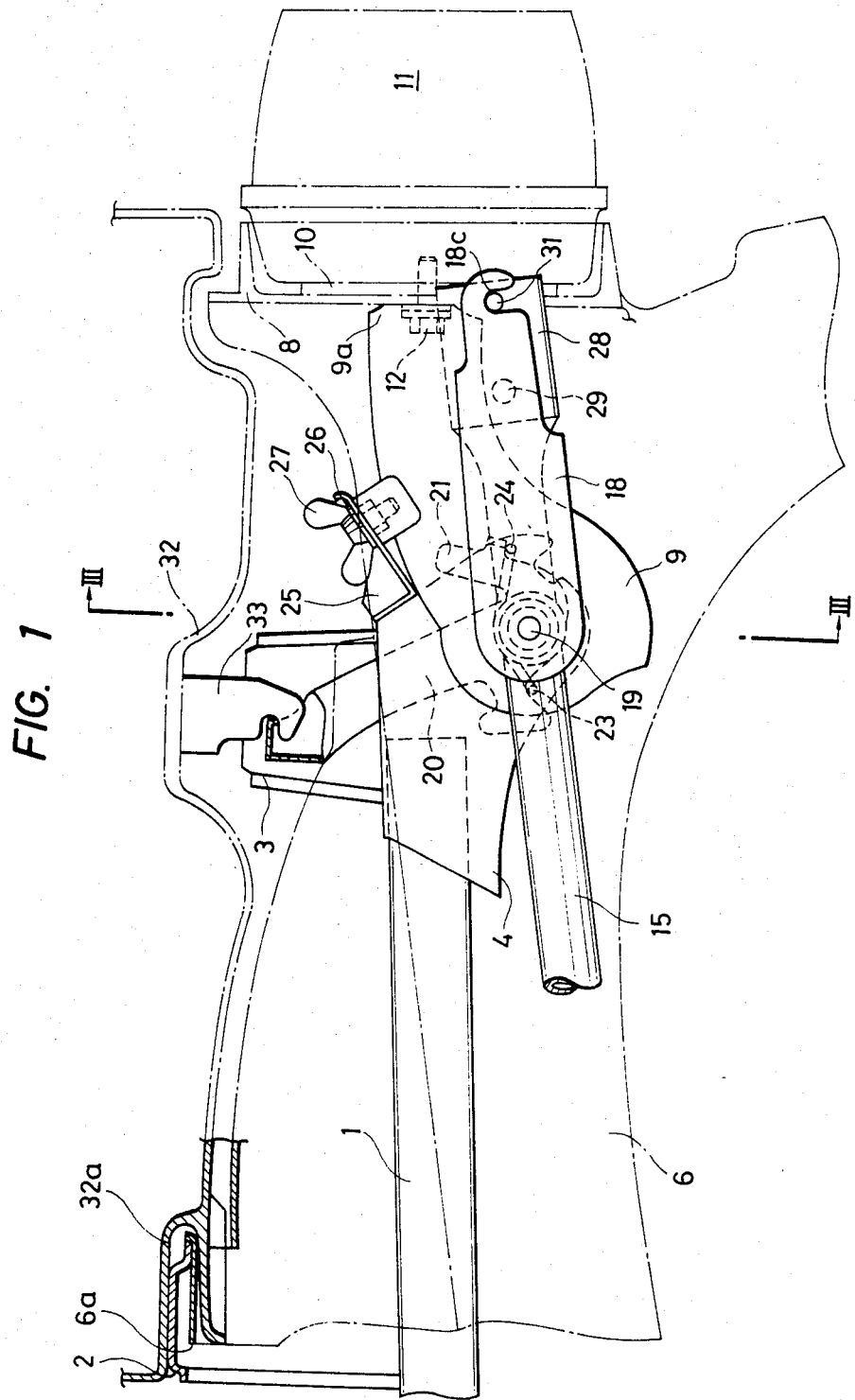

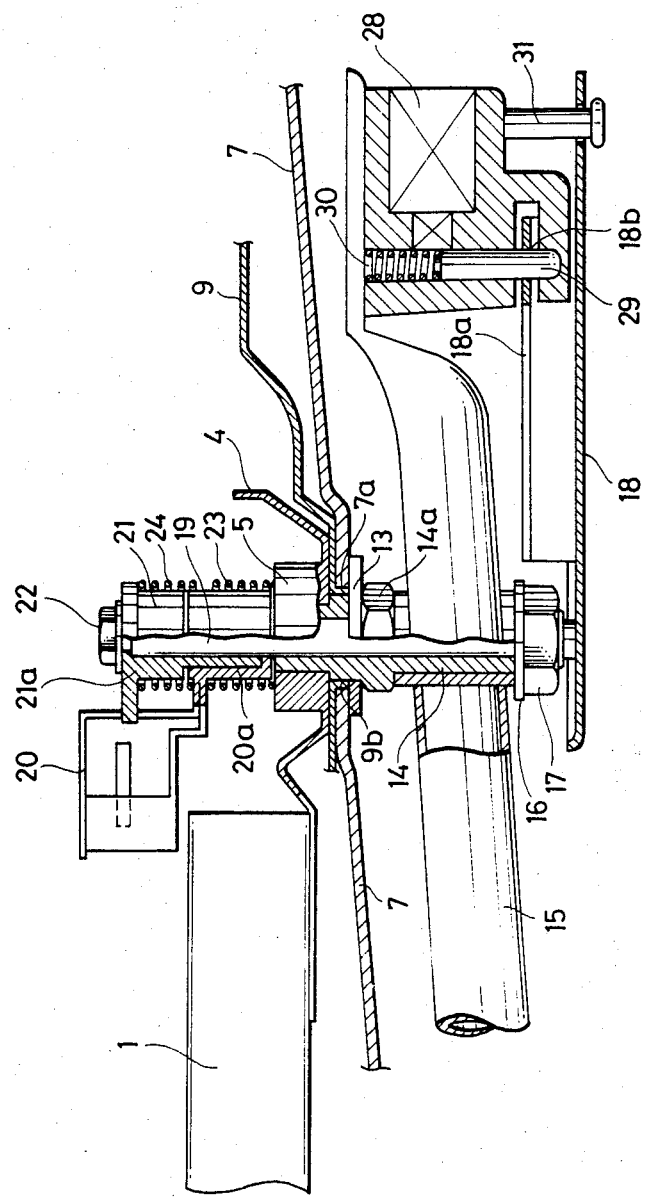

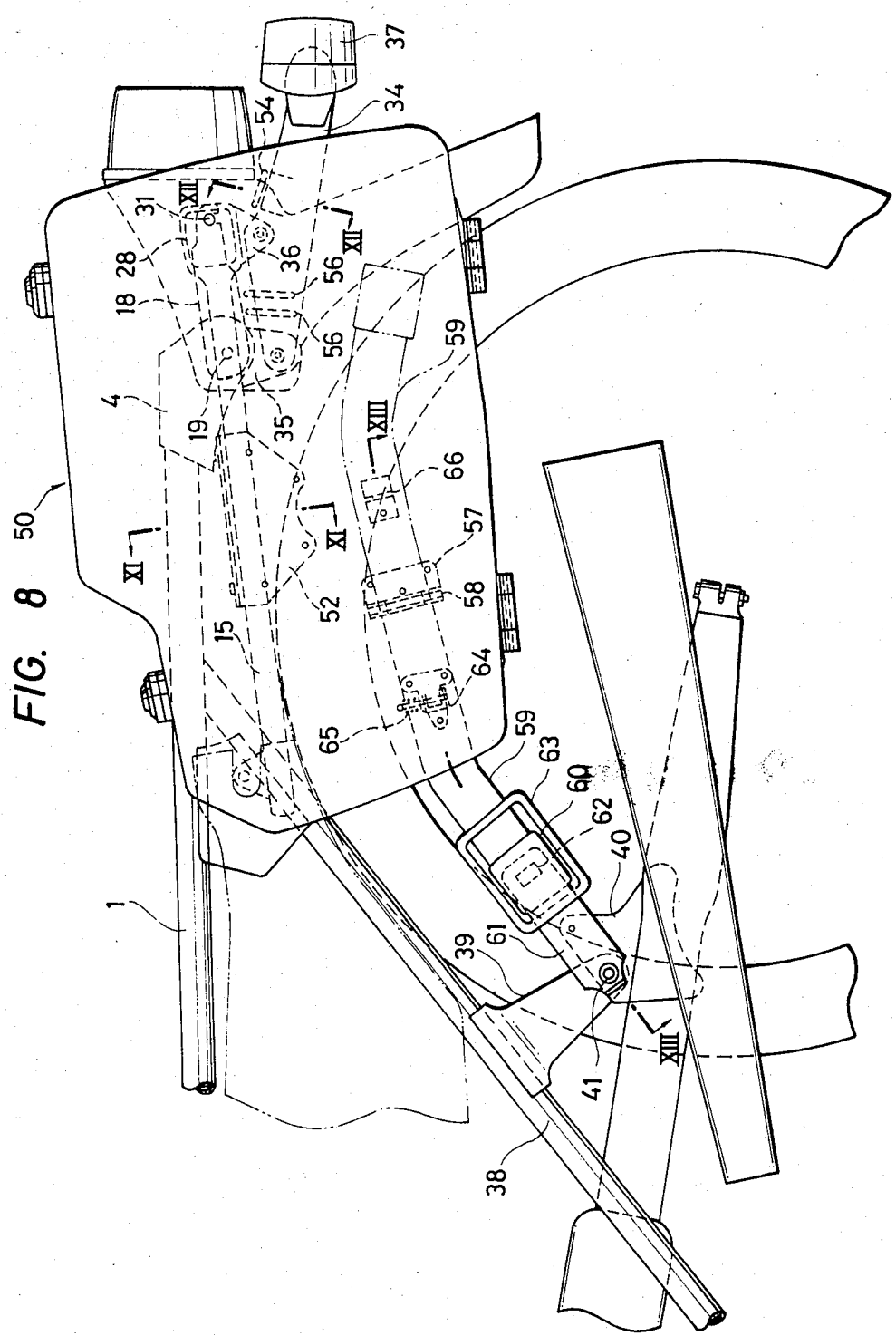

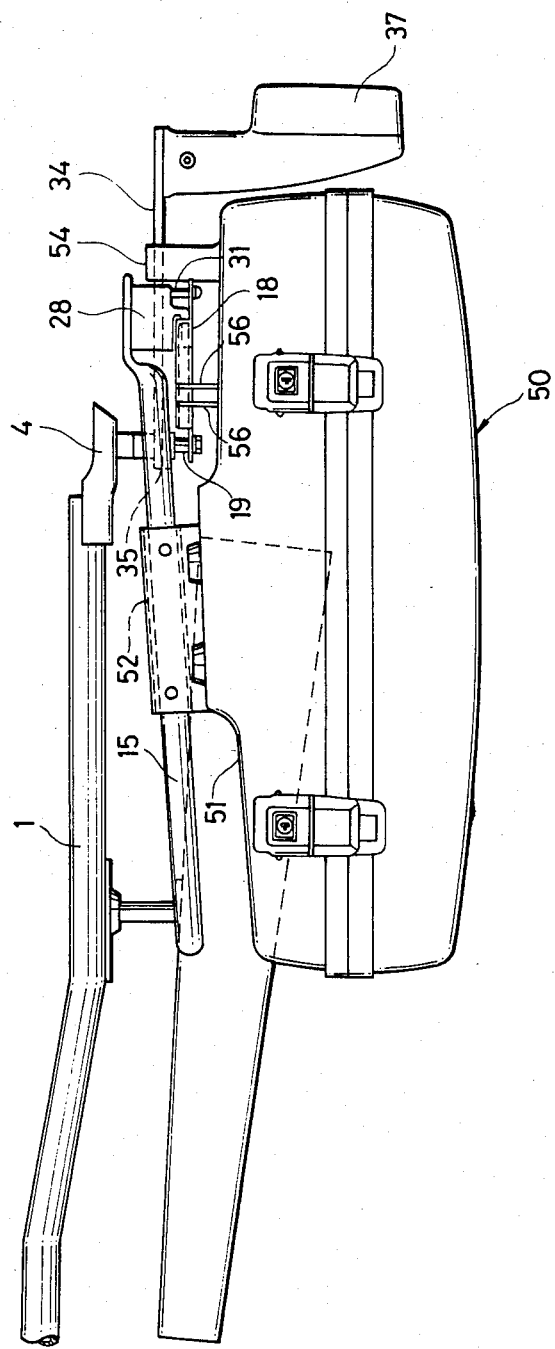

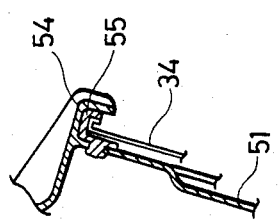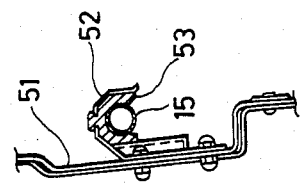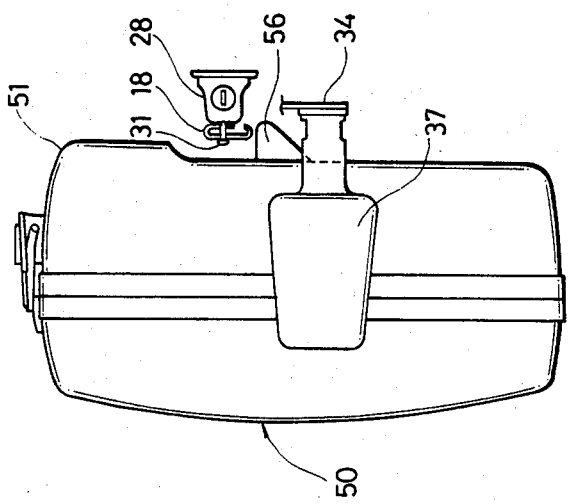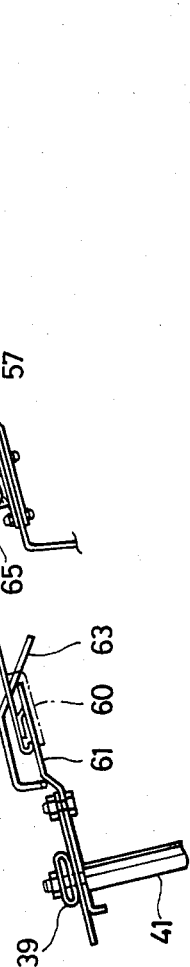

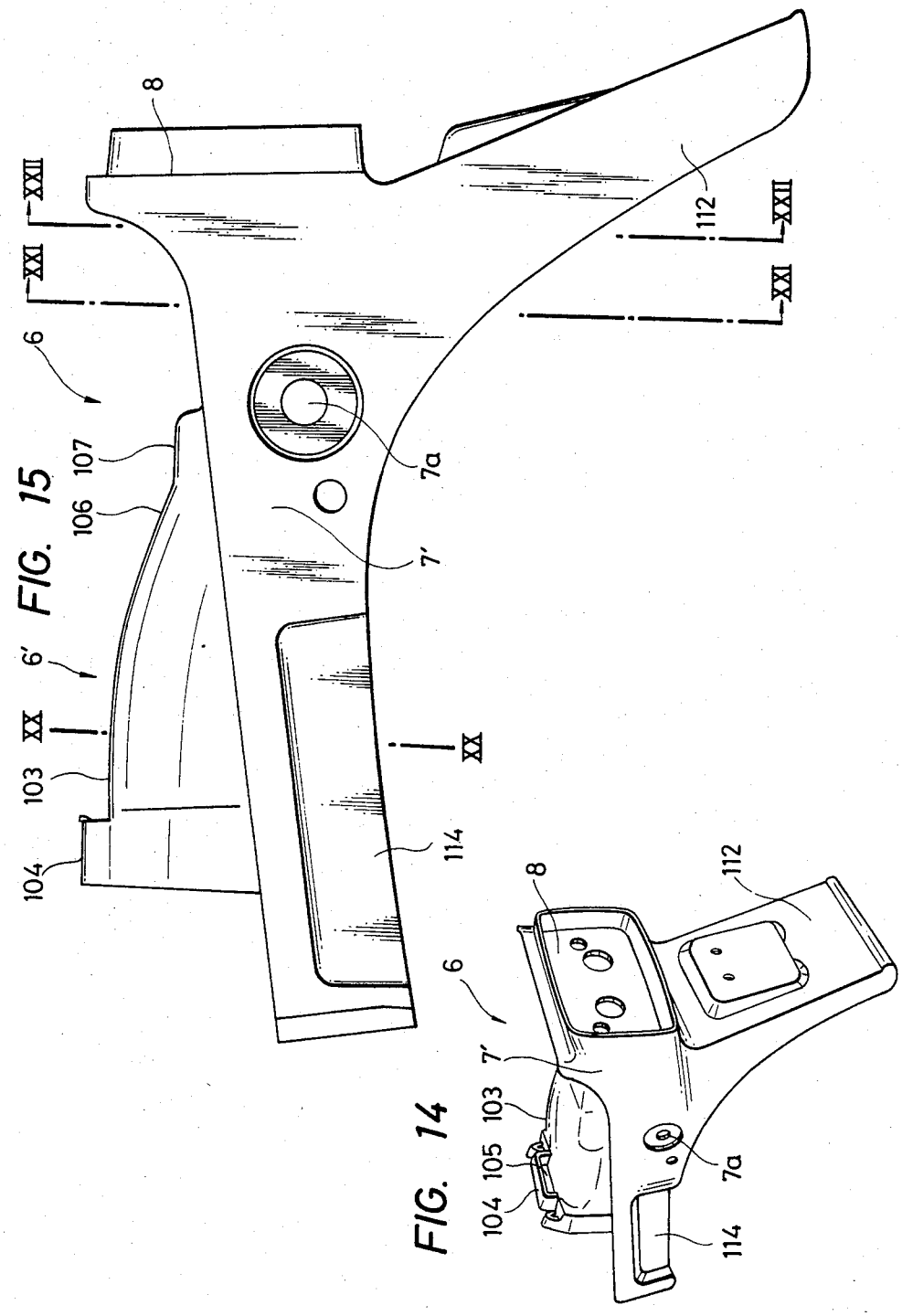

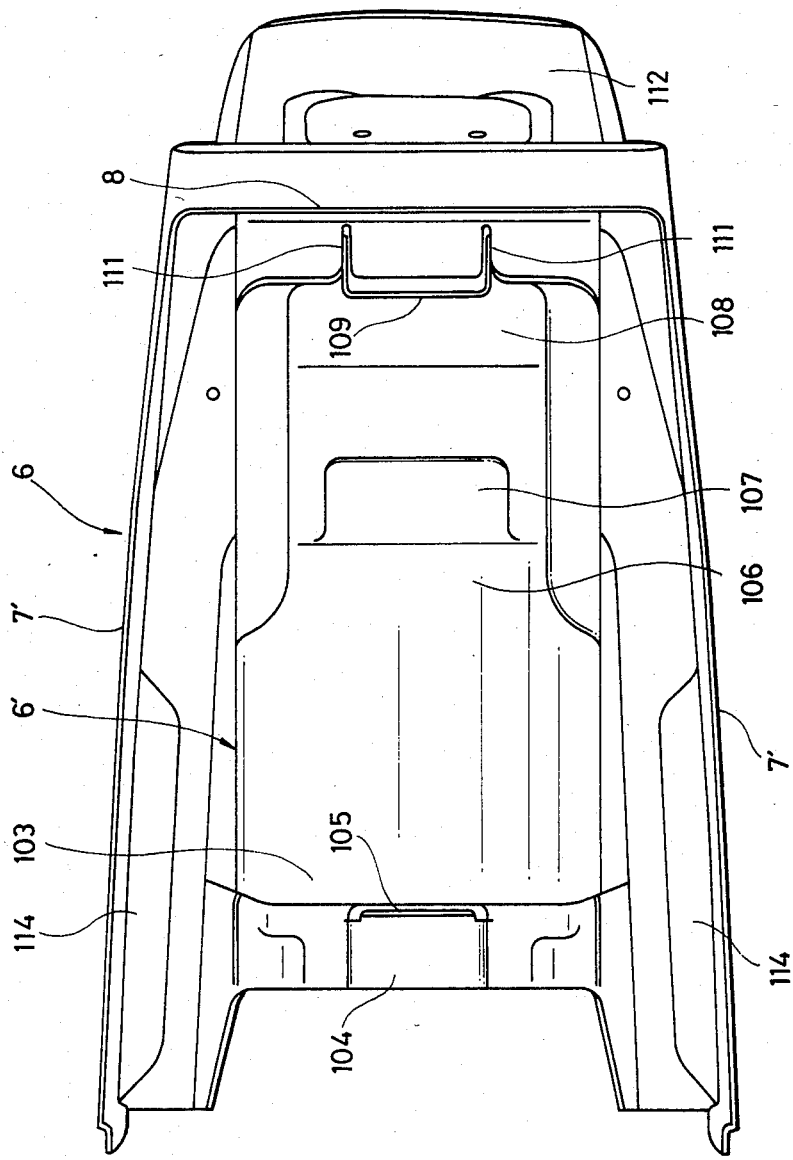

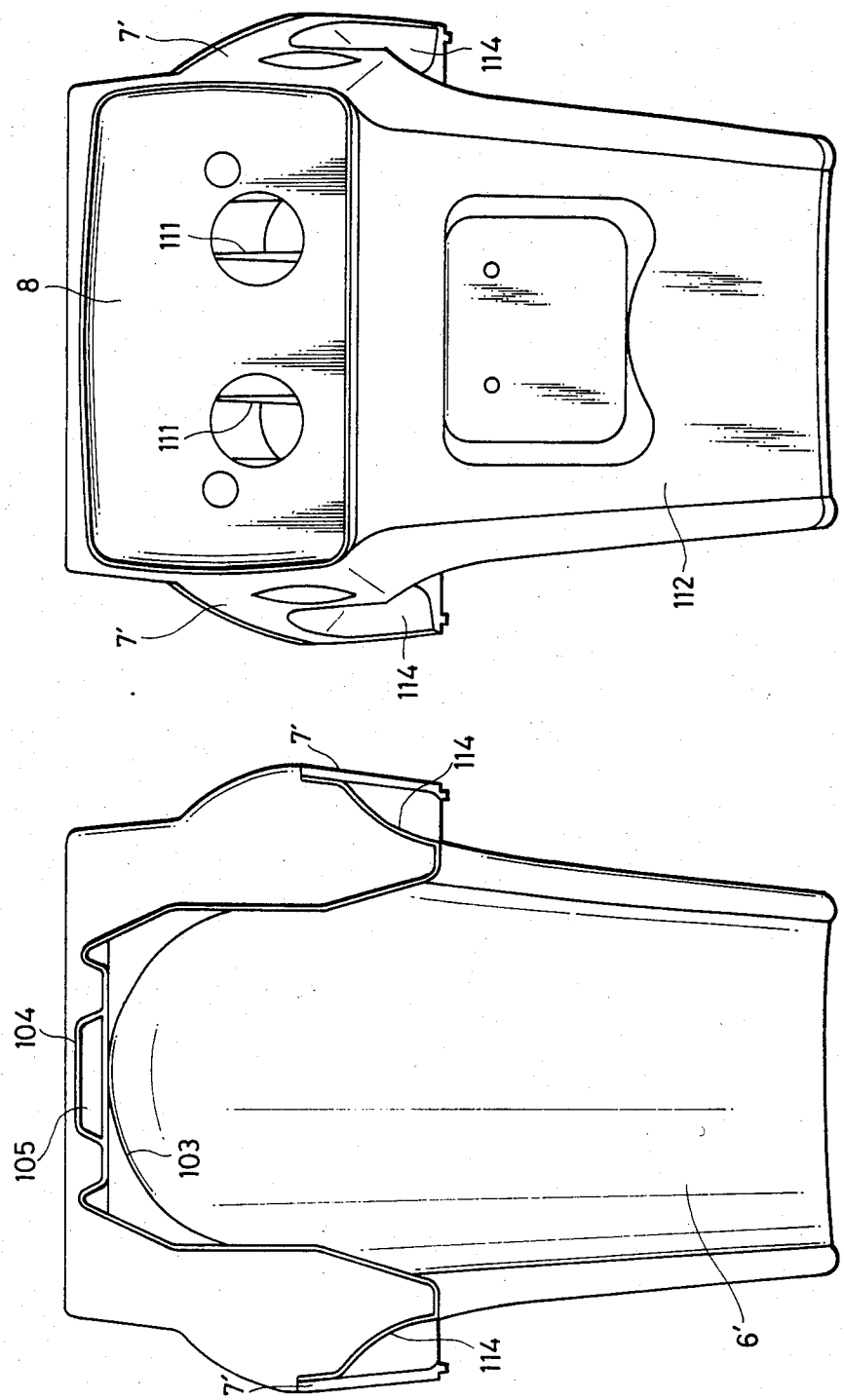

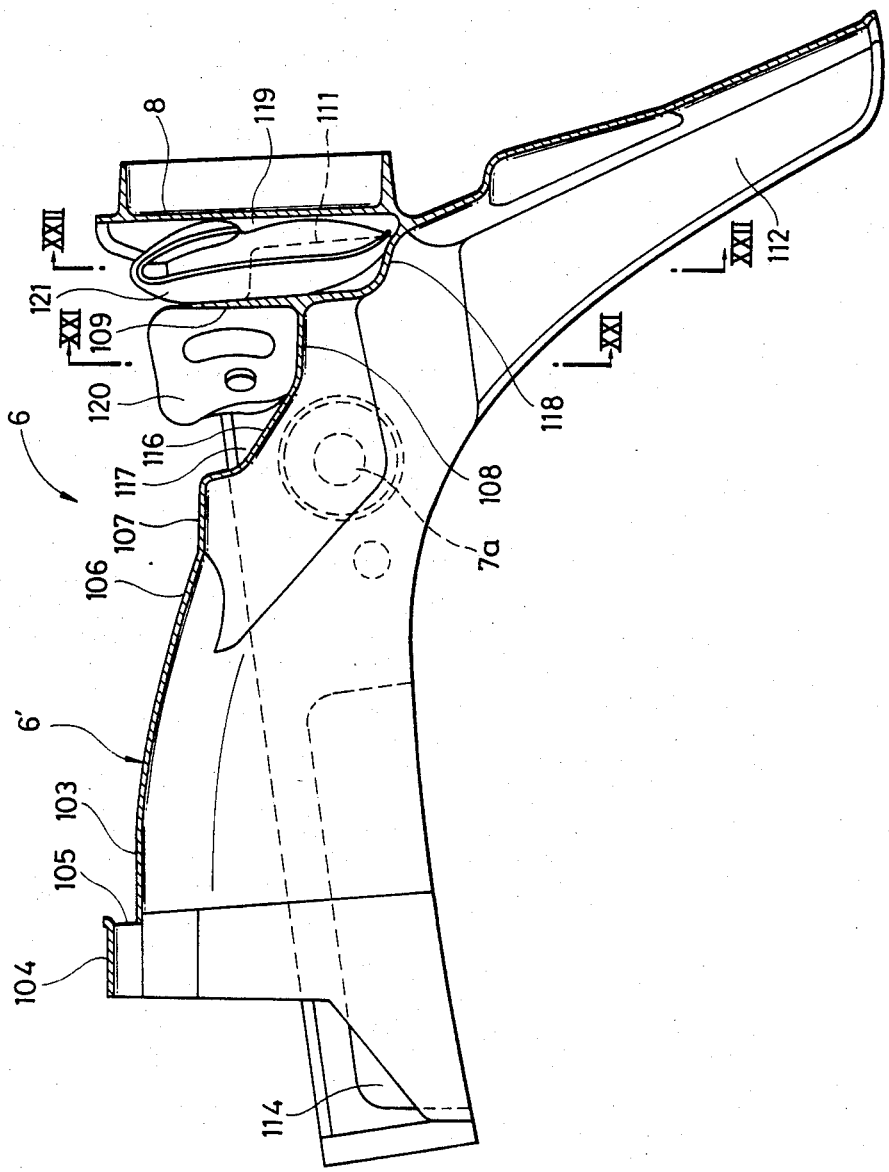

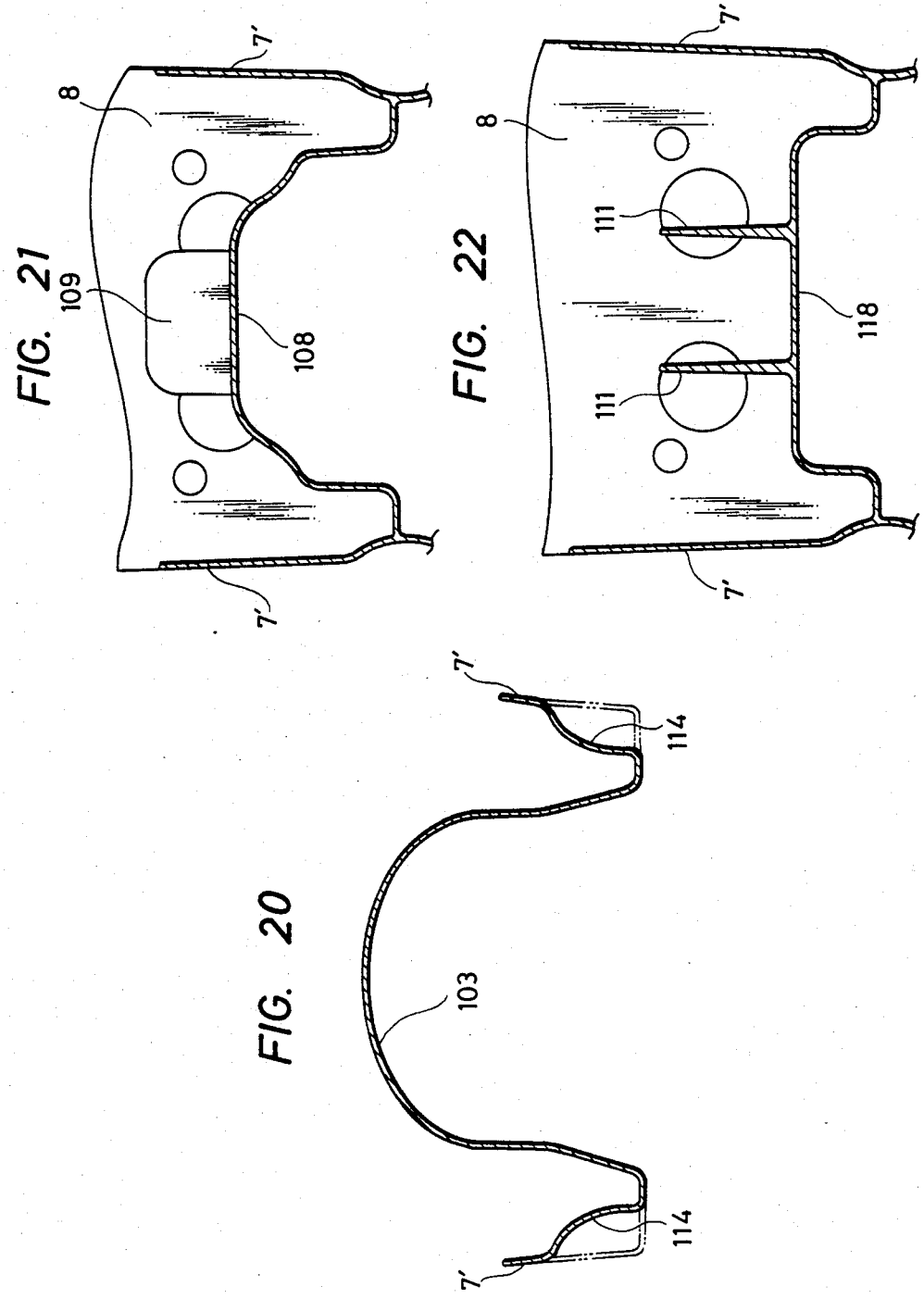

REAR FENDER STRUCTURE FOR MOTORCYCLES

This application is a continuation of application Ser. No. 304,468, filed Sept. 22, 1981, now abandoned.

BACKGROUND OF THE INVENTION

The present invention relates to an improvement of a rear fender for motorcycles.

In a general motorcycle, since the rear fender is fixedly secured to the motorcycle body, when the rear wheel is dismounted from the motorcycle, it is necessary to move downwardly the rear wheel, after the rear wheel is slightly displaced rearwardly.

In this case, it is possible to readily carry out the dismounting or mounting operation of the rear wheel with high efficiency, if a concave portion exists at the ground below the rear wheel. But at the normal flat ground, it is necessary to lift up the motorcycle and to maintain this lift-up condition. In the latter case, it is difficult to carry out the dismounting or mounting operation of the rear wheel in a short period of time.

Also, in order to detachably mount the upper mechanical parts such as a seat, on the upper portion of the motorcycle, normally, the parts must be mounted on a frame having a high strength through a bracket or the like.

For this reason, it is necessary to use particular mechanical parts such as brackets and it is difficult to mount or detach such particular mechanical parts.

Furthermore, in the conventional motorcycles, the mechanism for locking the upper mechanical part such as a rear box and the mechanism for locking the motorcycle side mechanical parts such as side bags are separately formed. Therefore, in order to mount the motorcycle side mechanical parts at predetermined positions, it is necessary to provide an additional mechanism for locking the motorcycle body side mechanical parts to thereby make the construction intricate and to make the locking operation troublesome.

In addition, in the conventional motorcycles, the cowl is separately provided relative to the rear fender, since these perform different function with each other. That is, the rear fender is adapted to cover the rear wheel, whereas the cowl is adapted to cover a space defined between the upper surface of the rear fender and the lower surface of a seat.

However, in case where the members are separately formed, there is a gap therebetween so that water and water mud and the like are liable to invade in the interior. After the hard long time usage of the motorcycle, it is necessary to dismount these members and to clean the mud or dust stuck to the outer surface of the rear fender and the inner surface of the seat cowl. This makes the maintenance and the adjustment intricate and troublesome.

Also, since these members are separated from each other, it is necessary to provide brackets or the screws for fixing each of these members to the motorcycle body to thereby make the construction intricate.

SUMMARY OF THE INVENTION

It is therefore an object of the present invention to overcome the above-mentioned drawbacks and to provide an improved rear fender and its associated means for use in a motorcycle.

Another object of the present invention is to provide a rear fender for a motorcycle enabling readily attachment and detachment of the rear wheel at any place.

Still another object of the present invention is to provide a locking device for the motorcycle upper mechanical parts such as a rear box, a seat or the like, enabling readily detachably mounting these members.

Another object of the present invention is to provide a locking device having a simple construction enabling locking the motorcycle upper and side mechanical parts to each other at a time.

Still another object of the invention is to provide a seat cowl and a rear fender having a simple construction which is easy to maintain and adjust in low cost.

Another object of the invention is to provide a rear fender for a motorcycle without necessity of providing separately a receiving box.

Briefly and in accordance with the present invention, the rear fender is swingably mounted on a support shaft formed on the motorcycle body frame. A mounting bracket for the tail light or the like is coupled integrally with the rear fender. The bracket is detachably mounted on the motorcycle body frame by fixing means such as bolts and nuts. An engagement groove for engaging with a cross member provided in the motorcycle body is formed on the bottom plates of the seat, the rear box or the like. At the same time, an engagement member is formed at the upper front portion of the rear fender so as to engage the engagement groove. Upon engagement between the cross member and the engagement groove, the engagement member is simultaneously interlocked with the engagement groove.

A connecting member for fixing a side bumper or the like to the motorcycle body frame is provided. A pivot shaft extends through the connecting member inwardly. A locking lever for engaging with upper mechanical parts such as a seat is provided at an inner extension of the pivot shaft. At the same time, an operation lever for operating the engagement of the locking lever with the upper mechanical parts is provided at the outer extension portion of the pivot shaft.

According to the present invention, an operation lever cooperates with the locking lever pivotally supported at a member fixed to the motorcycle body and is adapted to maintain the motorcycle upper mechanical parts at the locking position, and the locking device is provided at the mounting locus of the operation lever. At the same time, at the locking position of the operation lever the side bag is maintained at the locking position in abutment with the extending rib of the side bag.

Furthermore, according to another aspect of the present invention, a cowl portion extending from the fender toward the lower side edge portion of the seat is integrally formed. In particular, the partitioning walls are provided integrally with the fender. These walls are provided at the upper portion of the downwardly bent portion of the fender and extend in the direction substantially perpendicular to the vertical plane which is directed along longitudinal direction of the motorcycle.

These and other objects of the present invention will become apparent from the description of the drawings and the preferred embodiments which follow.

BRIEF DESCRIPTION OF THE DRAWINGS

In the drawings:

FIG. 1 is a partially elevational longitudinal sectional view of an embodiment of a rear fender for motorcycles according to the present invention;

FIG. 2 is a longitudinal horizontal sectional view of the rear fender shown in FIG. 1;

FIG. 8 is a side view showing a state where a side box is mounted on the motorcycle;

FIG. 9 is a plan view of the motorcycle shown in FIG. 8;

FIG. 10 is a rear view of the motorcycle shown in FIG. 8;

FIGS. 11 to 13 are cross sectional views taken along the lines XI—XI, XII—XII and XIII—XIII, respectively;

FIG. 14 is a perspective view showing one embodiment of a rear fender for a motorcycle according to the present invention;

FIG. 15 is a side view of the rear fender shown in FIG. 14;

FIG. 16 is a plan view of the rear fender shown in FIG. 14;

FIG. 17 is a front view of the rear fender shown in FIG. 14;

FIG. 18 is a rear view of the rear fender shown in FIG. 14;

FIG. 19 is a longitudinal sectional view of the rear fender shown in FIG. 14;

FIG. 20 is a cross sectional view of the motorcycle taken along the line XX—XX in FIG. 15 or FIG. 19; and FIGS. 21 and 22 are cross-sectional views of the motorcycle taken along the lines XXI—XXI and XXII—XXII of FIG. 15 (FIG. 19), respectively.

DETAILED DESCRIPTION OF THE PREFERRED EMBODIMENTS

Figure 7:
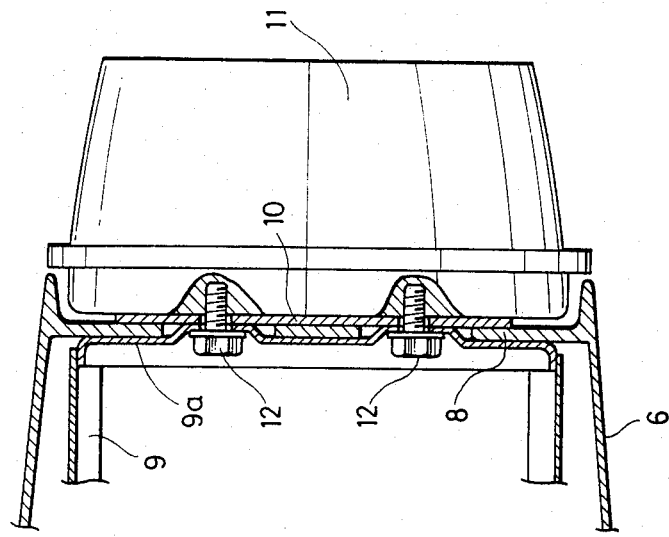
FIG. 7 is a longitudinal sectional view showing a state of a coupling relationship among the tail light bracket, the rear fender and the tail light.

The present invention will now be described with reference to FIGS. 1 to 7. Reference numeral 1 denotes a pair of side pipes disposed at the upper portion of a frame, and positioned at right and left sides of the motorcycle. The side pipes 1 are connected integrally with each other by cross members 2 and 3.

A frame stay 4 is secured to a rear end of each side pipe 1 by welding or the like. A stay reinforcement member 5 is formed integrally with an inner surface of the frame stay 4.

Figure 3:
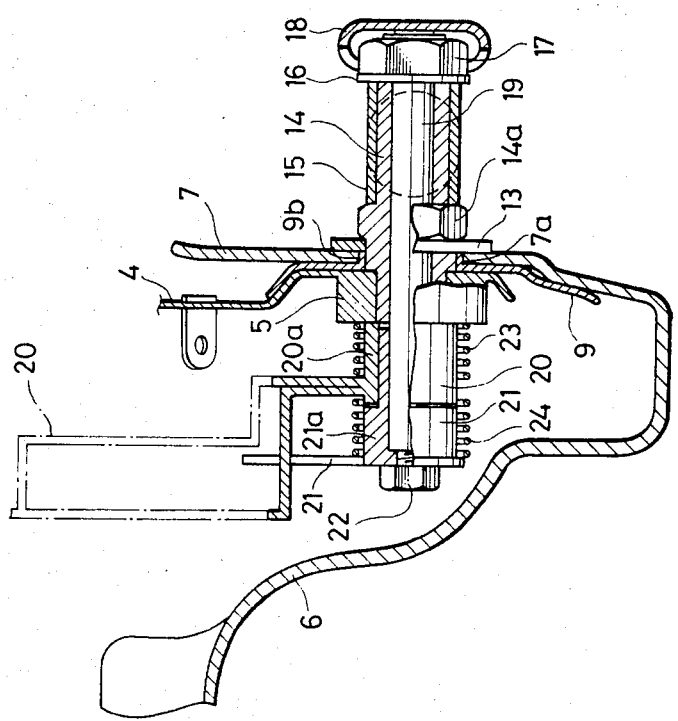
FIG. 3 is a cross-sectional view of the rear fender taken along the line III—III of FIG. 1.
Figure 4:
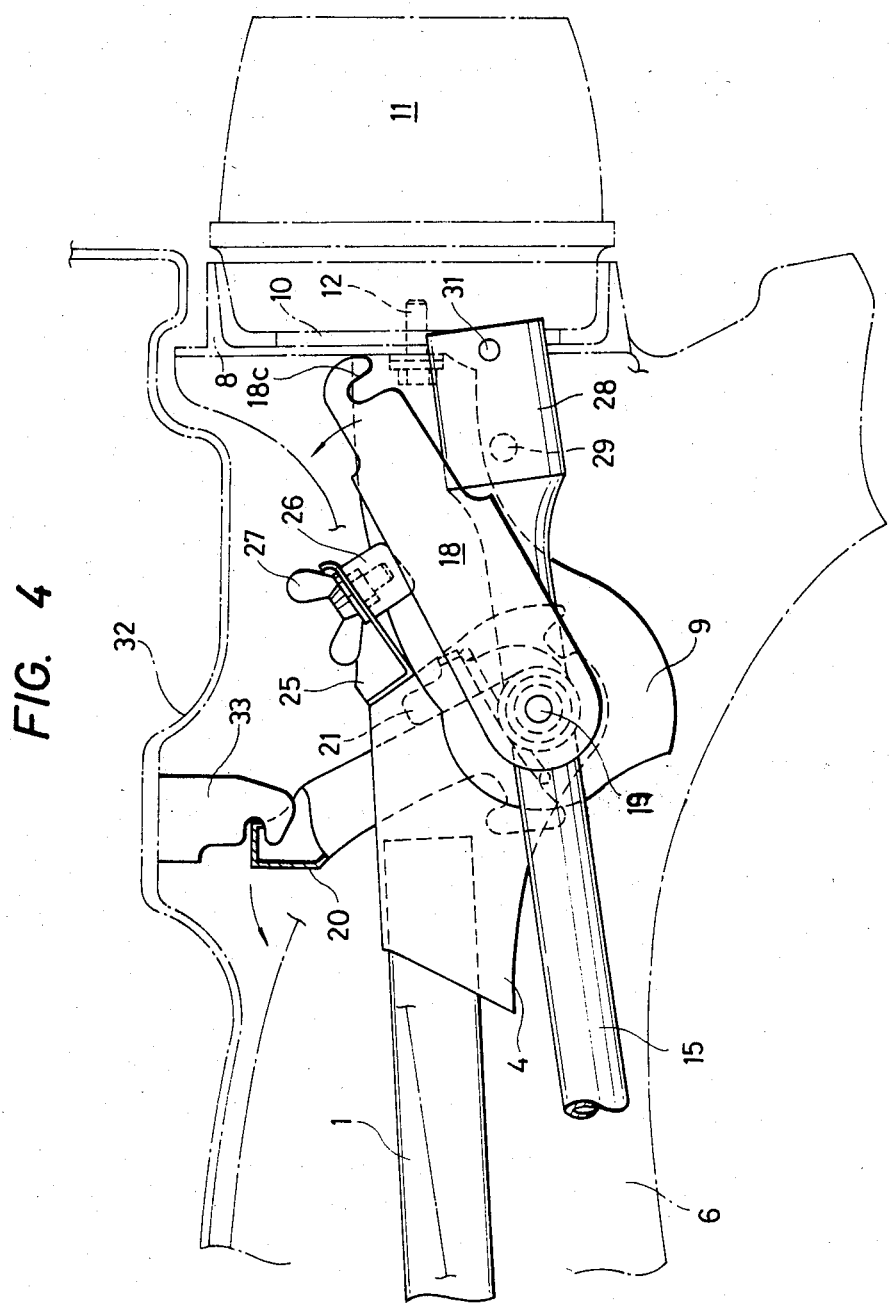
FIG. 4 is a side view showing the state where the key comb is released and the operation lever is rotated upwardly.
Figure 5:
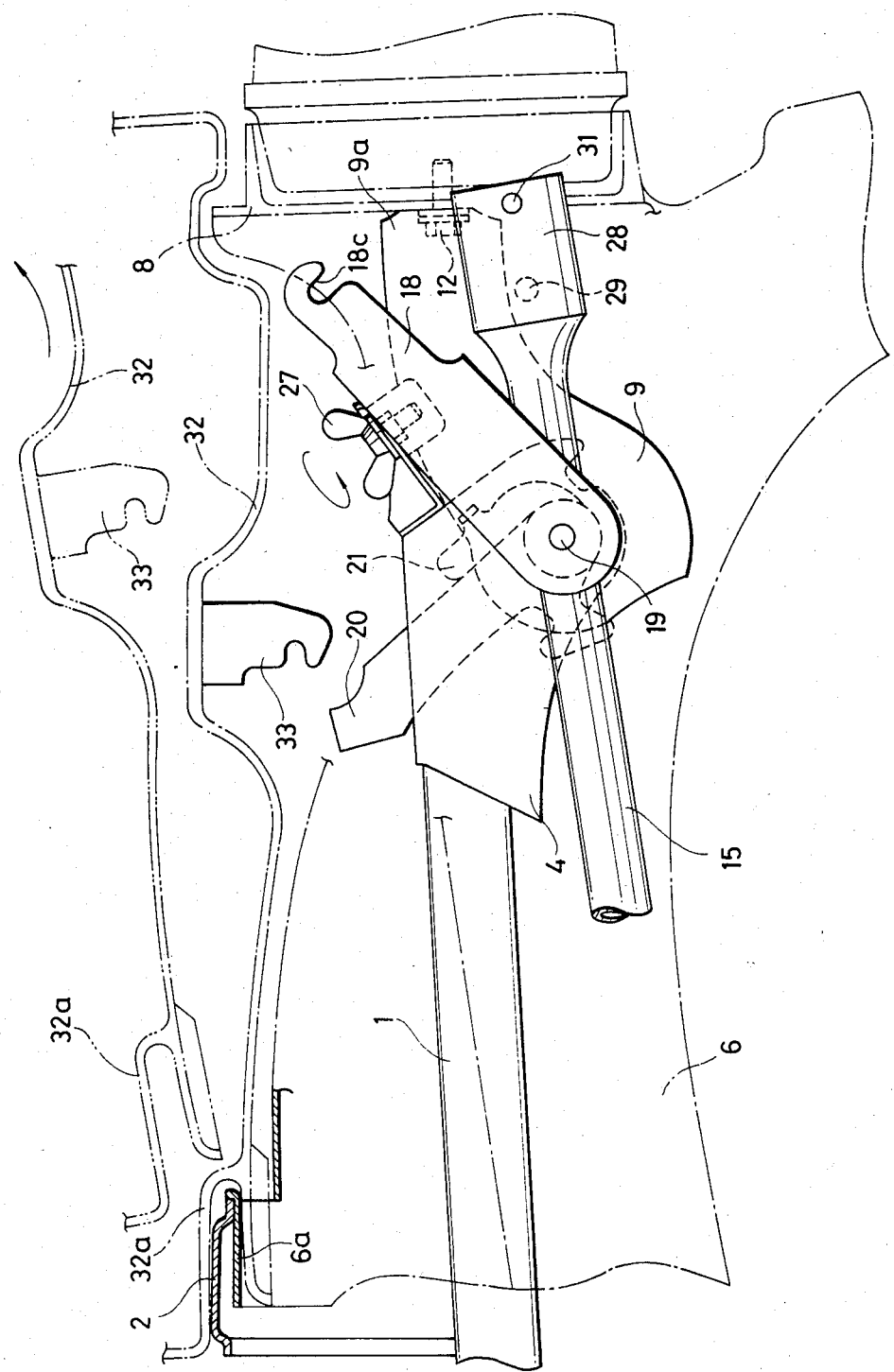
FIG. 5 is a side view showing the state in which the seat lock lever is disengaged from the hook.

Reference numeral 6 designates a rear fender. A seat cowl 7 extending from both side lower edges of the rear fender 6 and bent back upwardly is formed of rigid plastic material or the like. It is to be noted that the seat cowl 7 is provided integrally with the rear fender as best shown in FIG. 3. A hole 7a is formed in the seat cowl 7. Also, an engagement portion 6a is formed at a front end of the rear fender 6 as an interlocking piece.

A tail light mounting wall 8 is formed integrally with an upper rear end of the rear fender 6. A tail light 11 is fixedly secured to a rear surface of the tail light mounting wall 8 by bolts 12 through a mount rubber 10, whereas a pair of tail light brackets 9 are fixedly secured at their rear ends 9a to a front surface of the tail light mounting wall 8 by the common bolts 12.

Each of the front sleeve portions 9b of the above described tail light brackets 9 is fixedly inserted into the seat cowl hole 7a as best shown in FIG. 2. The frame stay 4 is weldingly secured to an inside of the tail light bracket 9. A sleeve bolt 14 which is a connecting member is inserted from the outside into the seat cowl hole 7a through a washer 13. The sleeve bolt 14 extends through a side bumper 15 positioned outside relative to a nut portion 14a of the sleeve bolt 14. A nut 17 is threadedly secured to the outer end of the sleeve bolt 14 through a washer 16. Thus, the sleeve bolt 14 is coupled integrally with the side bumper 15.

A pivot shaft 19 an outer end of which is secured to a base portion of an operation lever 18 by welding is inserted into a center bore of the above described sleeve bolt 14 from the outside. An inwardly extending portion of the pivot shaft 19 from the stay reinforcement member 5 is surrounded by a seat lock plate 21. A seat lock lever 20 which corresponds to an arm or a lock lever is rotatably provided around the outer periphery of the seat lock plate 21. By using a threaded nut 22, the seat lock plate 21 is integrally coupled to the above described pivot shaft 19, i.e., the operation lever 18.

A coil spring 23 is provided around an outer periphery of the above described seat lock lever 20 at a sleeve portion 20a thereof. One end of the coil spring 23 is engaged with the seat lock lever 20 and the other is engaged with the stay reinforcement member 5. By the biasing force of the coil spring 23, the seat lock lever 20 is urged to rotate in clockwise direction (in FIG. 1).

Furthermore, a coil spring 24 is provided around a sleeve portion 21a of the above described seat lock plate 21. One end of the coil spring 24 is coupled to the seat lock plate 21 while the other is coupled to the seat lock lever 20. By the force of the coil spring 24, the seat lock plate 21 is biased to rotate in counterclockwise direction (in FIG. 1).

Reference will be made to a mechanism for coupling the motorcycle body and the rear fender 6.

As mentioned above, the rear end portion 9a of the tail light bracket 9 is fixed to the tail light mounting wall 8 of the rear fender 6 and a sleeve portion 9b of the tail light bracket 9 is inserted into the hole 7a of the seat cowl 7 integral with the rear fender 6. Therefore, the rear fender 6 is rotatable about the sleeve bolt 14 together with the tail light bracket 9.

A stay bracket 25 is firmly coupled to the frame stay 4 forming a fixed part of the motorcycle body. A receiver 26 is formed integrally with the above described tail light bracket 9 so that the receiver 26 is positioned above the stay bracket 25. A butterfly bolt 27 is threadedly inserted into the receiver 26 with the receiver 26 being in contact with the above described stay bracket 25. As a result, the receiver 26 is coupled integrally with the stay bracket 25; namely, this means that the rear fender 6 is firmly secured to the motorcycle body.

A key comb 28 well known per se is mounted on the rear end of the side bumper 15. By inserting a key (not shown) into the key comb from the rear end thereof and rotating the key, a lock pin 29 is retracted inwardly against the force of a retaining coil spring 30 to thereby disengage a hole 18a formed in an engagement member 18a of the operation lever 18 from the lock pin 29.

A helmet holder 31 extends from an outer surface of the key comb 28. A cutaway portion 18c formed at the end of the operation lever 18 is engagable with the helmet holder 31.

Reference numeral 32 designates a bottom wall of a seat or a rear box. A bifurcated stop portion 32a forming therein an engagement groove extends forwardly along the center axis of the bottom wall 32. At the same time, a pair of hooks 33 extends downwardly from the underside of the wall 32. These hooks 33 are positioned just above the pair of the seat lock plate 21.

Reference will be made to a mounting structure of a side box usable for a side bag.

As shown in FIGS. 8 to 13, a mounting bracket 35 for mounting a rear blinker stay 34 is mounted integrally with a rear end of the side bumper 15. A bracket 36 is fixedly mounted on a lower portion of the key comb 28 fixed to the rear end of the above described side bumper 15. The rear blinker stay 34 is fixed to the above described two brackets 35 and 36 by bolts and nuts or the like. A blinker 37 is coupled to the rear blinker stay 34.

A mounting bracket 39 is coupled integrally with a lower frame 38 extending toward the front of the motorcycle and downwardly obliquely from the aforementioned side pipe 1. A buckle set 60 and pillion step 41 are mounted on the mounting bracket 39 and a muffler bracket 40.

A set bracket 52 which is one of engagement members is mounted on an inner side wall 51 of the side box 50 at a position slightly above the vertical center of the wall 51 by bolts and nuts or the like. A damper rubber 53 is mounted on the underside of the set bracket 52 (FIG. 11). The bracket 52 can be engaged with the side bumper is through the damper rubber 53.

A rear bracket 54 which is the other of the engagement members is formed integrally with the rear portion of the wall 51 of the side box on the motorcycle body side at vertical center portion thereof. A damper rubber 55 is mounted on the underside of the rear bracket 54 (FIG. 12). The rear bracket 54 can be engaged with the rear winker stay 34 through the damper rubber 55.

Two ribs 56 extend from the above described side wall 51 of the side box at approximately the center between the above described two brackets 52 and 54. When the aforedescribed operational lever 18 is rotated in the downward direction, the above described ribs 56 are engageable with the operation lever 18.

A pivot support member 57 positioned obliquely downwardly in front of the above described set bracket 52 is secured to the above described side wall 51 by bolts and nuts. A belt 59 made of metal is rotatably mounted on the pivot support member 57 through a pin 58. The buckle set 60 is coupled integrally with an end of the belt 59. The buckle set 60 is formed in the same manner as a well known general safety seat belt buckle set. When the above described buckle set 60 is moved toward the pillion step 41 along an extension line of the longitudinal direction of a buckle set receiver 61, an engagement portion (not shown) of the buckle set 60 is engaged with an engagement hole 62 of the receiver 61 so that the two portions 60 and 61 are engaged integrally with each other. A release member (not shown) is provided on an outer surface of the buckle set 60. When the release member is depressed, the two members 60 and 61 are disengaged from each other. A reference numeral 63 denotes a protector for the above described buckle set 60.

When the belt 59 is stretched forwardly, since a holding member 64 for holding the belt is pivotally mounted on the above described wall 51, the holding member 64 may be engaged with the belt 59 by the action of a coil spring 65. When the belt 59 is foldingly bent rearwardly, a set spring 66 for holding the belt is mounted on the above described wall 51.

A structure of the rear fender according to the present invention will now be explained with reference to FIGS. 14 to 22.

Reference numeral 6 denotes a rear fender made of rigid plastic, which is composed of a fender portion 6' and a cowl portion 7', the two portions being coupled integrally with each other.

The configuration of the above described rear fender 6' is generally formed as a well known rear fender configuration, but there are some special structures. The cross section of an upper portion 103 of the fender portion 6' is formed in an arcuate shape so that the upper portion 103 has a predetermined interval with respect to an upper portion of the rear wheel (not shown) of the motorcycle. The lower portion of the rear fender 6' extends substantially parallel to the corresponding portion of the rear wheel and the lowermost portion thereof is slightly bent outwardly. At a front end portion of the upper fender portion 103, an engagement portion 104 with which a bifurcated engagement member extending from the lower surface of the rear seat or the rear box in the forward direction is engaged for integrally coupling the upper fender portion 103 to a cross member of the motorcycle body is formed extending upwardly from the fender upper portion 103 at a predetermined interval 105. The cross section of the lower portion 112 of the fender portion 6' is the same shape as a well known rear fender lower portion.

An intermediate portion 106 between the above described fender upper portion 103 and lower portion 112 is quite novel. As shown in FIG. 19, stepped portions 107 and 108 are formed at predetermined distance in the longitudinal cross section. A partitioning wall 109 extends vertically upwardly from the rear step portion 108 (FIG. 21). The tail light mounting wall 8 upwardly extends from the boundary portion of the rear fender lower portion behind the partitioning wall 109. As shown in FIG. 16, dividing walls 111 which extend vertically along the motorcycle axis are formed on the fender at a predetermined interval in the widthwise direction. The dividing walls are positioned between the partitioning wall 109 and the tail light mounting wall 8.

A cowl portion 7' is integrally formed with both lower ends of the fender upper portion 103 and is bent back upwardly. A front lower portion 114 of the cowl portion 7' is curved in order not to greatly space apart from a side surface of the fender upper portion 103. The front lower curved portion 114 is in the form of a concave shape for readily achieving the swing operation of the rear fender 6 in the clockwise direction in FIG. 15.

Also, the cowl portion 7' extends rearwardly so as to cover the side surfaces of the fender upper portion 103 and the intermediate portion 106 and is formed integrally with the tail light mounting wall 8.

A hole 7a which is engaged swingably with the pivot shaft 19 (in FIG. 1) formed integrally with the motorcycle body (not shown) is formed behind the cowl portion 7' at a position corresponding to the intermediate portion 106 of the fender. Such structure is described in detail as above.

With such a construction, since on each side of the motorcycle, a substantially U-shaped groove is formed by the fender portion 6' and the cowl portion 7', even if the rainwater falls on the rear fender 6, the rainwater is readily discharged from a front side of the groove to the outside.

Since a concave portion is formed by the step portion 108, the partitioning wall 109, the tail lamp mounting wall 8 and the cowl portion 7', the concave portion may be used as a utility loading space.

In the above described embodiment, the rear fender 6 is rotatably mounted on the motorcycle, but it is apparent to use the fender as a well known fixed rear fender.

In the above described embodiment, on each side of the motorcycle, the cowl portion 7' bent back upwardly from the fender portion 6' is provided so as to form a U-shaped connecting portion, it is possible to form an inverted U-shaped cross section by the upper end periphery of the cowl portion 7' and the upper end periphery of the fender portion 6'. Otherwise, it is possible to form a hollow portion by the two upper peripheries by curving and connecting the two peripheries.

In the fender structure thus constructed, a tool receiving portion 117 is formed by a slant portion 116 extending from the front step portion 107 to the rear step portion 108 and the right and left cowl portions 7'. Therefore, it is possible to receive a tool bag 120 in the tool receiving portion 117.

Further, since a utility box 119 is formed by the partitioning wall 109, the rear side step portion 118 positioned behind the wall 109, the tail light mounting wall 8 and the right and left dividing wall 111, small materials 121 can be received in the utility box. Furthermore, it is possible to mount the tail light 11 on the predetermined portion by the bolts 12 (FIG. 1).

Upon engagement between the bifurcated member 32a and the engagement portion 104 and engagement between the hooks 33 and the seat lock lever 20 (FIG. 1), the tool receiving portion 117 and the utility box 119 can be covered by the seat or the rear box, so that the falls of the tool bag and other materials apart from these receiving portions can be prevented.

The operation of the embodiment shown in FIGS. 1 to 7 will be described.

With reference to FIG. 1, in the state where the rear fender 6 is normally fixed to the motorcycle body, the following operations are carried out in order to swing the rear fender 6 in the counterclockwise direction in FIG. 1.

A key (not shown) is inserted into the rear end surface of the key comb 28 and the key is rotated to thereby render the lock pin 29 retracted inwardly. Subsequently, the lock pin 29 is disengaged from the engagement hole 18b of the operation lever 18. By the force of the coil spring 24 for the seat lock plate, the operation lever 18 is swung upwardly through the seat lock plate 21 and the pivot shaft 19. In the state where the seat lock plate 21 is in abutment with the seat lock lever 20, the operation lever 18 is at a standstill (see FIG. 4).

Subsequently, the operation lever 18 is manually swung upward, so that the lock plate 21 is rotated together and the seat lock lever 20 is rotated in the same direction together. As a result, the seat lock lever 20 is disengaged from the hook 33 extending from the bottom wall 32 of the seat or the rear box downwardly (see FIG. 5).

In this condition, since the cross member 2 and the rear fender end engagement portion 6a are only clamped between the bottom wall 32 and the bifurcated stop member 32a, when the seat or the rear box is retracted rearwardly, the bottom wall 32 and the bifurcated stop member 32a are disengaged from the cross member 2 and the rear fender front end engagement portion 6a to thereby remove the seat or the rear box from the motorcycle body.

Figure 6:
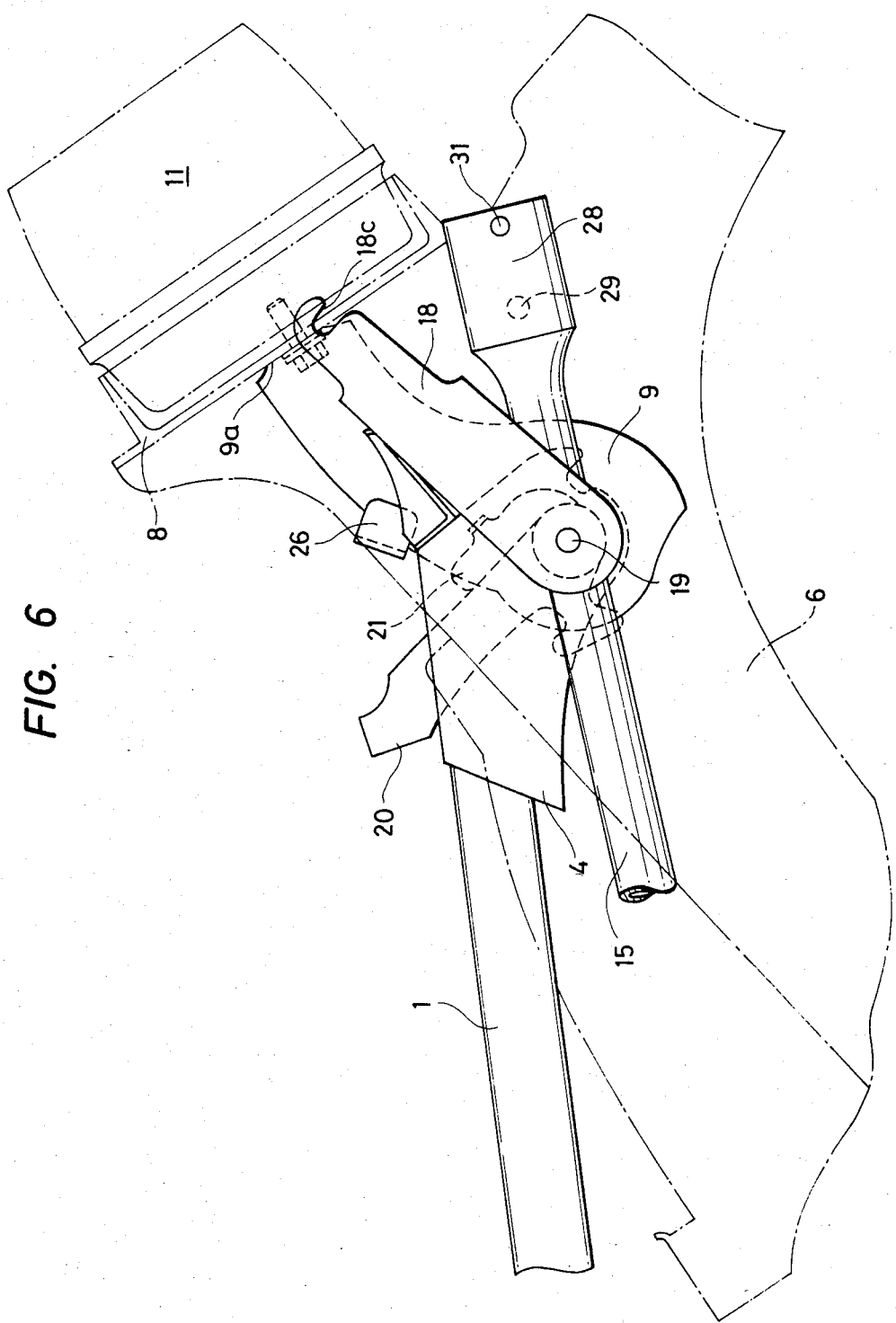
FIG. 6 is a side view showing the state in which the rear fender is held obliquely.

Since the butterfly bolt 27 is exposed, by dismounting the butterfly bolt 27, the stay bracket 25 integral with the side pipe 1 and with the frame stay 4 is disengaged from the receiver 26 integral with the rear fender 6 and with the tail light bracket 9 so that the rear fender 6 can be rotated in the counterclockwise direction as shown in FIG. 6.

Therefore, in the above described embodiment, since the rear end of the rear fender 6 can be swung upward, in the condition where the rear wheel is slightly separated from the road or the like it is possible to readily disassemble and the mount rear wheel.

Apparently, normal fender position can be restored by the operation reversal to those described above. At the same time, the seat or the rear box is mounted suitably and the rear fender 6 is firmly positioned at a normal state.

In the above described embodiment, the rear fender is fixed at two positions, but it is possible to fix the rear fender by using a double nut manner, a wedge connection manner or the like at the front end portion of the rear fender, i.e., at the position far from the pivot shaft 19.

Also, in the above described embodiment, the rear fender 6 is rotatably supported around the cowl hole 7a positioned in the center of the rear fender 6 in the travel direction of the motorcycle. However, the rear fender 6 can be rotatably supported around a suitable position in front of the center of the longitudinal direction. For example, after the bottom wall 32 of the seat or the like is moved forwardly, the rear fender front end engagement portion 6a and the cross member 2 are connected to each other with the bifurcated stop member 32a, and thereafter, the rear fender 6 can be connected integrally with the motorcycle body behind the center of the rear fender 6. The same effect can be obtained with such a modification.

In the above described embodiment, front end engagement portion 6a of the rear fender 6 is secured between the bottom wall 32 and the stop member 32a in contact with the lower surface of the cross member 2, the front end portion of the rear fender 6 is fixed and at the same time the metal receiver 26 integral with the tail light mounting wall 8 through the tail light bracket 9 is connected to the stay bracket 25 integral with the frame stay 4 by means of butterfly bolt 27 to thus secure the upper rear portion of the rear fender. Therefore, the fixing reliability of the rear fender 6 is enhanced.

Particularly, even if the rear fender 6 is made of rigid plastic, the butterfly bolt 27 threadedly engaged with the stay bracket 25 is not directly contacted against the rear fender 6 but contacted with the tail light bracket 9. Therefore, clamping force attendant to the butterfly bolt 27 does not locally apply to the rear fender. Accordingly, the rear fender is positively coupled to the motorcycle body without receiving undue stress.

Also, in the above described embodiment, since the tail light mounting portion 8 of the rear fender, the tail light 11 and the tail light bracket 9 are coupled integrally with each other by means of the bolt 13, these three members are positively fixed with simple construction.

In the above described embodiment, in the condition where the front end engagement portion 6a of the rear fender 6 is in contact with the cross member 2, and the bifurcated stop member 32a extending from the bottom wall 32 of the seat or the rear box is inserted, the rear fender 6 can be fixed to the motorcycle body.

In the above described embodiment, since only by operating the outermost operation lever 18, the seat lock lever 20 can be swung, and therefore, it is facilitated to carry out the attachment or detachment operation of the seat or the rear box.

Further, the pivot shaft 19 is fitted in the sleeve bolt 14, which is a connecting member for connecting the side bumper 15 and the frame stay 4 and the stay reinforcement member 5, (frame stay 4 and the reinforcement member 5 are the members of motorocycle body) so that mechanical strength of the sleeve bolt 14 and the pivot shaft can be sufficiently utilized, to thus render the overall construction simplified.

Furthermore, in the above described embodiment, it is possible to mount a side box 50 to the motorcycle by the following operations (FIGS. 8 to 13).

Firstly, after the belt 59 is stretched forwardly and the belt 59 stretched in this condition is held at the holder member 64, the key comb 28 is released to thereby rotate the operation lever 18 upwardly. In this condition, the buckle set 60 is inserted into the buckle set receiving member 61. At the same time, the side box 50 is moved obliquely downwardly along the extension line of the receiver member 61, so that the set bracket 52 is engaged with the side bumper 15 and the rear bracket 54 is engaged with the rear blinker stay 34, whereupon the buckle set 60 is coupled to the buckle set receiver member 61.

Subsequently, the operation lever 18 is lowered, so as to abut against the helmet holder 31, to thereby automatically operate the key comb 28 and to thereby lock the operation lever 18 with the lock pin 29. As a result, the rib 56 integral with the side box 50 is engaged with the operational lever 18.

In such a mounting condition of the side box 50, almost all weight of the side box 50 is supported by the side bumper 15 through the set bracket 52.

Also, the inertia force of the side box 50 in the back and forth direction accompanying the running of the motorcycle is sustainable by the engagement between the rear blinker stay 34 and the rear bracket 54 and by the engagement between the buckle set 60 and the buckle set receiver member 61. Further, the inertia force of the side box 50 along vertical direction is sustainable by the engagement between the rib 56 integral with the side box and the operation lever 18 fixed by the key comb 28. Accordingly, even if the any inertia or any external force is applied to the side box with the motorcycle running, the side box 50 is fixed firmly.

Since the buckle set receiver member 61 is solely exposed irrespective of the attachment and detachment of the side box 50, such a structure is superior in an aesthetic design. In addition, the attachment and detachment of the side box 50 is readily performed. Furthermore, since the rubbers 53 and 55 for damping the impulse are provided at underside of the brackets 52 and 54, respectively, the vibration or fluctuation caused during running of the motorcycle are positively absorbed.

The resultant effects and the advantages of the present invention are as follows:

(a) In case of the attachment or detachment of the rear wheel, the upward lifting of the motorcycle body can be eliminated. Instead, by swinging the rear fender so as to position the rear end of the fender upwardly, and by positioning the rear wheel slightly away from the ground, the rear wheel can be moved rearwardly without its vertical movement and without the disturbance of the rear portion of the rear fender. Therefore, according to the present invention, it is possible to carry out the attachment and detachment of the rear wheel in a short period of time with high efficiency.

(b) Since the mount bracket for the tail light or the like is formed integrally with the rear fender, and the bracket is detachably mounted on the motorcycle body frame through fixing means such as bolts and nuts, it is possible to fix the rear fender to the above described motorcycle body frame by fixing the mount bracket to the motorcycle body frame by means of the fixing means.

(c) Also with the invention, by the detachment of the fixing means, it is possible to release the engagement between the motorcycle body frame and the rear fender and to freely rotate the rear fender around the above described pivot shaft. Therefore, the rear wheel attachment and detachment are carried out rapidly with high efficiency.

(d) According to the present invention, since the above described bracket is fixed to the motorcycle body through the bolts and nuts, the rear fender can be fixed to the motorcycle body frame with a high reliability without effects of the various stresses and vibrations accompanying the running.

(e) By holding the engagement member between the engagement groove and the cross member, it is possible to fix the rear fender to the motorcycle body.

(f) By moving the rear box or the seat to thereby release the engagement groove from the cross member and the engagement member, the disengagement between the motorcycle body and the rear fender is attained and the rear fender can be suitably moved so that the attachment and detachment of the rear wheel can be performed in a short period of time.

(g) By the operation of the operation lever, it is possible to provide engagement or disengagement between the lock lever and the upper mechanical parts, and therefore, the upper mechanical parts can be readily attached or detached relative to the motorcycle body.

(h) According to the present invention, since the pivot shaft by which the lock lever and the operation member are coupled to each other is inserted in the coupling member by which the side bumper or the like is coupled to the motorcycle body frame, it is possible to utilize the strength of the coupling member and the pivot shaft. Therefore, a particular stay and a bracket for the lock device can be dispensed to thereby simplify the construction.

(i) After the motorcycle upper mechanical parts and the motorcycle side mechanical parts are suitably mounted on the motorcycle body, the operation lever can be held at the lock position by the lock means. Accordingly, the motorcycle upper mechnical parts and the motorcycle side mechanical parts are simultaneously fixed.

(j) According to the present invention, by the operation in the opposite order, the motorcycle upper mechanical parts and the motorcycle side mechanical parts can be dismounted.

(k) Thus, according to the present invention, the attachment and detachment of the motorcycle body upper mechanical parts and the motorcycle body side mechanical parts can be readily performed.

(l) Furthermore, according to the present invention, the fixing of the motorcycle body upper mechanical parts and the motorcycle side mechanical parts is achieved by the common members. This leads to a simplification of the lock device structure.

(m) Since the cowl portions extending from the fender portion to the seat under side portions are formed integrally with the rear fender, there is no gap between the fender portion and the cowl portions. Water, foreign material, dusts or the like cannot invade into the space defined by the outer surface of the fender and the inner surfaces of the cowl portions. It is not necessary to frequently clean the outer surface of the fender portion and the inner surfaces of the cowl portions. The cleaning is easy since there is no seam therebetween. This leads to a maintenance-free feature.

(n) According to the present invention, since the fender portion is integrally formed with the cowl portion, it is necessary to fix either the fender portion or the cowl portion to the motorcycle body. As a result, the number of fittings is remarkably decreased and the construction is simplified and is low in cost.

(o) Since the vertical partitioning wall is formed integrally with the rear fender at the lower step portion of the fender in the direction perpendicular to the motorcycle running direction, it is possible to form the receiving portion at the dead space defined at the upper space of the rear lower step portion of the rear fender. According to the present invention, with the thus structure, it is unnecessary to provide an independent receptacle.

The present invention has heretofore described particularly with reference to the accompanying drawings, but it will be understood that the present invention is never limited to the specific embodiments and various modifications can be made without departing from the spirit of the present invention.

What is claimed is:

1. A rear fender structure for use in a motorcycle comprising; a rear fender, a support shaft supported to a motorcycle frame body, an upper member comprising a seat or rear box positioned to overlap with said rear fender, and interlocking means provided between said rear fender and said upper member, said rear fender being pivotally secured at an intermediate portion thereof to said support shaft and detachably engaged with said upper member through said interlocking means.

2. A rear fender structure as defined in claim 1, wherein said support shaft comprises a sleeve bolt and a pivot shaft coaxially supported by said sleeve bolt, said sleeve bolt being supported by said motorcycle frame body.

3. A rear fender structure as defined in claim 1, further including a first locking means for providing interlocking engagement between said rear fender and said upper member of said motorcycle, said first locking means comprising;
 (a) an operation lever having one end fixedly secured to one end of said pivot shaft,
 (b) a seat lock plate secured to the other end of said pivot shaft,
 (c) a seat lock lever rotatably provided around said seat lock plate, and
 (d) hook means extending downwardly from said upper member, said seat lock lever being engageable with said hook means to provide fixed position of said rear fender relative to said upper member.

4. A rear fender structure as defined in claim 2 or 3 further including a fixing means for fixing said rear fender to said motorcycle frame body, said fixing means comprising;
 (a) a tail light bracket having one end supported by said sleeve bolt, said tail light bracket being integral with said rear fender through a seat cowl integral with said rear fender,
 (b) a receiver provided integral with said tail light bracket,
 (c) a frame stay 4 provided integral with said motorcycle frame body,
 (d) a stay bracket coupled to said frame stay, and
 (e) a butterfly bolt adapted to couple said stay bracket to said tail light bracket through said receiver, to thus provide coupling between said rear fender and said motorcycle frame body.

5. A rear fender structure as defined in claim 4, wherein said tail light bracket has the other end fixed to a tail light wall adapted to mount a tail light thereon.

6. A rear fender structure as defined in claim 3, further including a second locking means for providing locking engagement between said rear fender and said upper member, said second locking means comprising;
 (a) a locking piece disposed at an upper surface of a front portion of said rear fender,
 (b) a cross member disposed integral with said motorcycle frame body, and
 (c) an engagement groove formed in a bottom portion of said upper member, said locking piece being held between said cross member and said engagement groove upon the said cross member engaging said engagement groove.

7. A rear fender structure as defined in claim 3, further including a side bumper secured to said frame body, and wherein said operation lever has the other end engaged with a lock pin at the fixed position of said rear fender, said lock pin being retractably secured in a key comb disposed at a rear end of said side bumper.

8. A rear fender structure as defined in claim 7, further comprising;
 (a) a first coil spring provided around a sleeve portion of said seat lock lever, said first spring having one end connected to said seat lock lever and the other end connected to said motorcycle frame body, said first spring providing a biasing force so as to urge said seat lock lever to bring into engagement with said hook means, and
 (b) a second coil spring provided around a sleeve portion of said seat lock plate, said second spring having one end connected to said seat lock plate and the other end to said seat lock lever, said second spring providing a biasing force to rotate said operation lever toward the disengagement direction from said lock pin.

9. A rear fender structure as defined in claim 7, further including a support means for supporting a side bag disposed at the longitudinal side of said motorcycle, said support means comprising:
  (a) a mounting bracket disposed integral with said side bumper for mounting a rear winker stay thereon,
  (b) a set bracket fixed to a side wall of said side bag, said set bracket being engageable with said side bumper, and said side wall confronting said motorcycle frame body,
  (c) a rear bracket fixed to said side wall of said side bag, said rear bracket being engageable with said rear winker stay, and
  (d) ribs extending from said side wall of said side bag, said ribs being engageable with said operation lever when said operation lever is brought into engagement with said lock pin.

10. A rear fender structure as defined in claim 9, further comprising;
  (a) a bracket fixedly mounted on said key comb, said rear winker stay being fixed to said mounting bracket and said bracket,
  (b) a second mounting bracket fixedly secured to said motorcycle frame body,
  (c) a muffler bracket for supporting a muffler,
  (d) a buckle set mounted on said muffler bracket and said second mounting bracket,
  (e) a pivot support member secured to said side wall of said side bag,
  (f) a metal belt pivotally mounted to said pivot support member through a pin, said buckle set being coupled to one end of said belt,
  (g) a buckle set receiver engageable with said buckle set, and
  (h) a holder member adapted to hold said belt and being secured to said side wall of said side bag, said operation lever being abuttable against said pin to thus automatically operate said key comb, to thereby provide locking engagement between said operation lever and said lock pin.

11. A rear fender structure as defined in claim 9, further comprising a first damper member disposed between said set bracket and said side bumper, and a second damper member disposed between said rear bracket and said rear blinker stay.

12. A rear fender structure as defined in claim 1, wherein said rear fender has a fender portion and a cowl portion integrally formed with said fender portion, said cowl portion extending upwards from a lower portion of said rear fender to said upper member at both longitudinal sides thereof.

13. A rear fender structure as defined in claim 12, wherein said fender portion and said cowl portion provide a U-shaped groove in cross section at the boundrary portion therebetween.

14. A rear fender structure as defined in claim 12, wherein said fender portion provides a front portion, an intermediate portion and a rear portion, said front portion having a locking piece at an upper surface thereof to engage said motorcycle frame body, and said intermediate portion providing two stepped portions each spaced apart along travel direction of said motorcycle, whereby a tool receiving space is provided at a space defined by a portion between said two stepped portion and said pair of cowl portions.

15. A rear fender structure as defined in claim 14, further comprising a partitioning wall vertically extending upwardly from said rear stepped portion, a tail light mounting wall positioned behind said partitioning wall, and dividing walls vertically extending in a direction perpendicular to said partitioning wall, said dividing walls extending from a rear side stepped portion positioned between said partitioning wall and said tail light mounting wall whereby a second receiving space is provided at a space defined by said partitioning wall, said rear side step portion, said tail light mounting wall and said dividing walls.

16. A rear fender structure as defined in claims 14 or 15, wherein open ends of said first and second receiving spaces are covered by said upper member upon fixing thereof.

17. A rear fender structure for use in a motorcycle comprising a rear fender having a fender portion and a cowl portion integrally extending from said fender portion; a motorcycle frame body integrally providing a side bumper; an upper member such as seat and a rear box positioned above said rear fender; a support shaft adapted to pivotally support said rear fender; and rear fender latching means including first and second locking means each providing locking engagement between said rear fender and said upper member, and a fixing means for fixing said rear fender to said motorcycle frame body.

18. A rear fender structure for use in a motorcycle comprising: a rear fender having a fender portion and a cowl portion integrally extending from said fender portion; a motorcycle frame body integrally providing a bumper and a frame stay; an upper member such as a seat and a rear box position above said rear fender; a support shaft having a sleeve bolt supported by said motorcycle frame body and a pivot shaft extending through said sleeve bolt; and rear fender latching means; said rear fender being pivotally rotatable on said sleeve bolt, and said rear fender latching means including a first locking means for providing interlocking engagement between said rear fender and said upper member, a second locking means for providing locking engagement between said rear fender and said upper member, and a fixing means for fixing said rear fender to said motorcycle frame body; said first locking means including an operation lever having one end fixedly secured to one end of said pivot shaft, a seat lock plate secured to the other end of said pivot shaft, a seat lock lever rotatably provided around said seat lock plate, hook means positioned above said seat lock lever and extending downwardly from said upper member, said seat lock lever being engagable with said hook means to provide fixed position of said rear fender relative to said upper member, a first coil spring provided around a sleeve portion of said seat lock lever, said first spring having one end connected to said seat lock lever and the other end to said motorcycle frame body, said first spring providing a biasing force so as to urge said seat lock lever to bring into engagement with said hook means, and a second coil spring provided around a sleeve portion of said seat lock plate, said second spring having one end connected to said seat lock plate and the other end to said seat lock lever, said operation lever having the other end engaged with a lock pin at the fixed position of said rear fender, said lock pin being retractably secured in a key comb disposed at a rear end of said side bumper, said second coil spring providing a biasing force to rotate said operation lever toward its disengagement direction from said lock pin; said fixing means including a tail light bracket having one end supported by said sleeve bolt, said tail light bracket being integral with said rear fender through said seat cowl, a receiver provided integral with said tail light bracket, said frame stay, a stay bracket coupled to said frame stay, and a butterfly bolt adapted to couple said stay bracket to said tail light bracket through said receiver, to thus provide coupling between said rear fender and said motorcycle frame body, said tail light bracket having the other end fixed to a tail light wall adapted to mount a tail light thereon; and said second locking means including a locking piece disposed at an upper surface of a front portion of said rear fender, a cross member disposed integral with said motorcycle frame body, and an engagement groove formed in a bottom portion of said upper member, said locking piece being held between said cross member and said engagement groove upon the latter two engageing together.

19. A rear fender structure for use in a motorcycle comprising; a rear fender, a support shaft supported to a motorcycle frame boyd, an upper member comprising a seat or rear box positioned to overlap with said rear fender, interlocking means provided between said rear fender and said upper member, said rear fender being pivotally secured at an intermediate portion thereof to said support shaft and detachably engaged with said upper member through said interlocking means, and operation means for facilitating the disengagement of an interlocking relation between said rear fender and said upper member.

20. A rear fender structure as defined in claim 19, wherein said support shaft comprises a sleeve bolt and a pivot shaft coaxially supported by said sleeve bolt, said sleeve bolt being supported by said motorcycle frame body and a side bumper secured to said frame body.

21. A rear fender structure as defined in claim 20, further including a first locking means for providing interlocking engagement between said rear fender and an upper member of said motorcycle, said first locking means comprising;
   (a) said operation means comprises an operation lever having one end fixedly secured to one end of said pivot shaft,
   (b) a seat lock plate secured to the other end of said pivot shaft,
   (c) a seat lock lever rotatably provided around said seat lock plate, and
   (d) hook means extending downwardly from said upper member, said seat lock lever being engageable with said hook means to provide fixed position of said rear fender relative to said upper member.

* * * * *